UNITED STATES PATENT OFFICE.

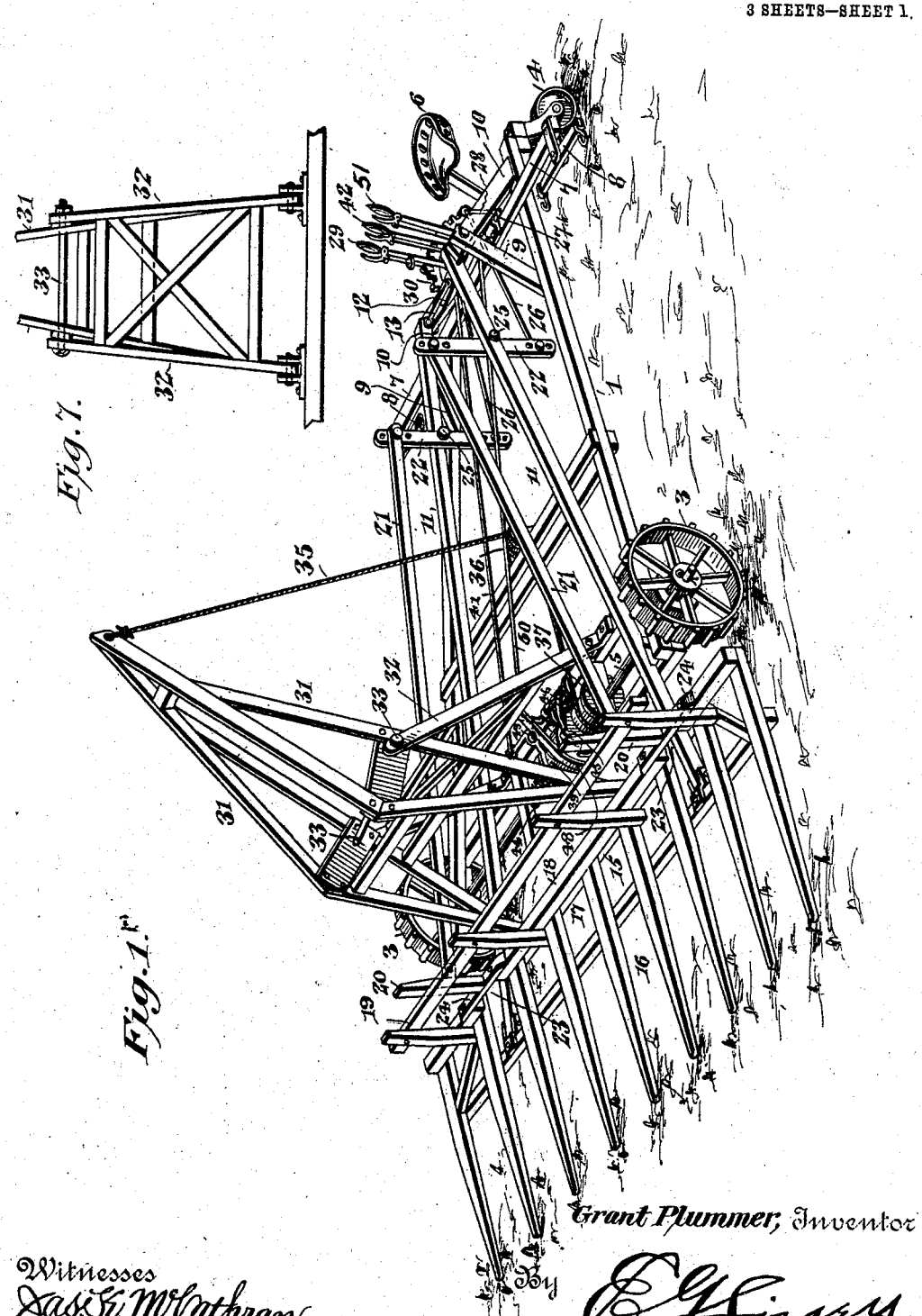

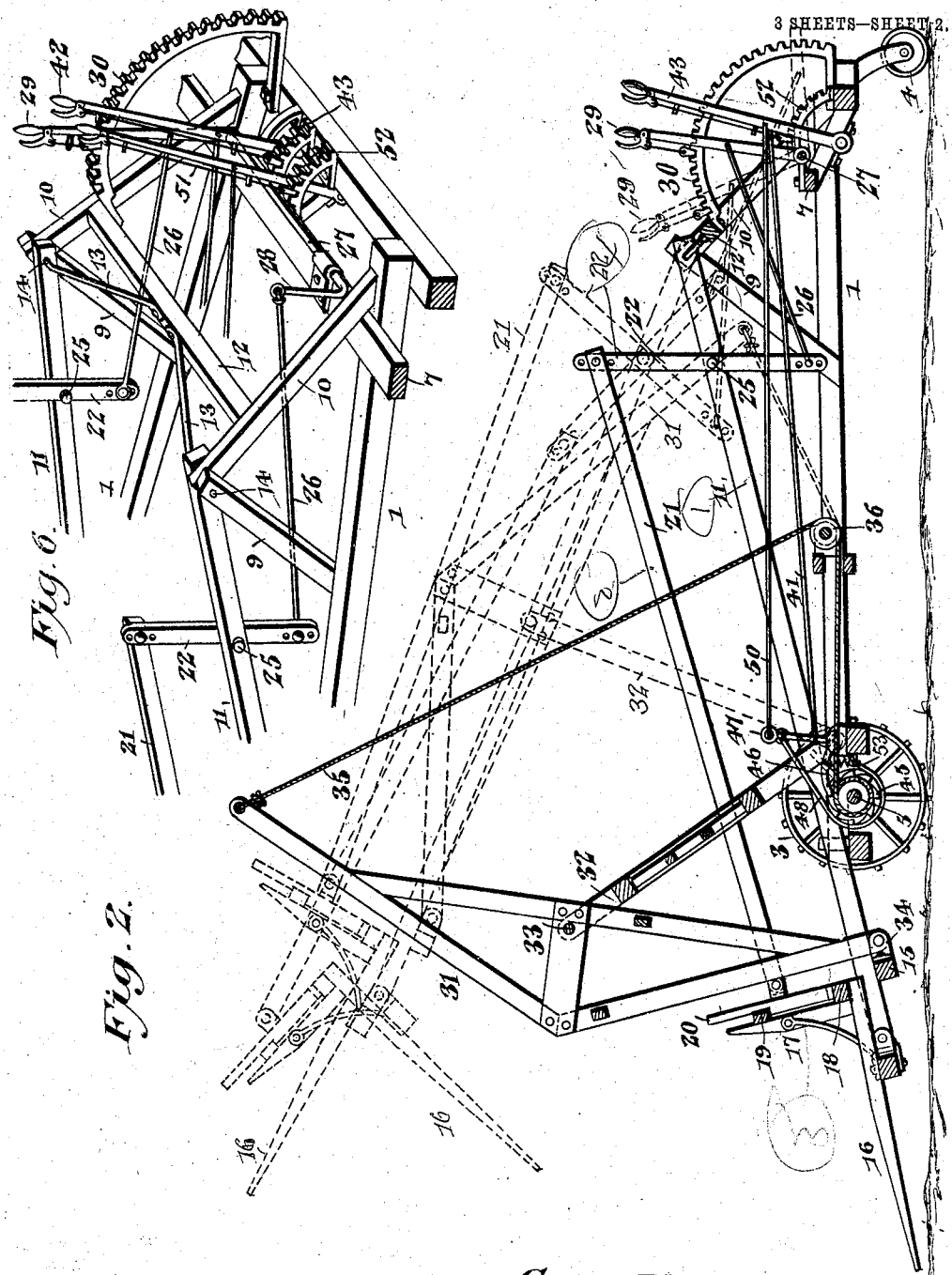

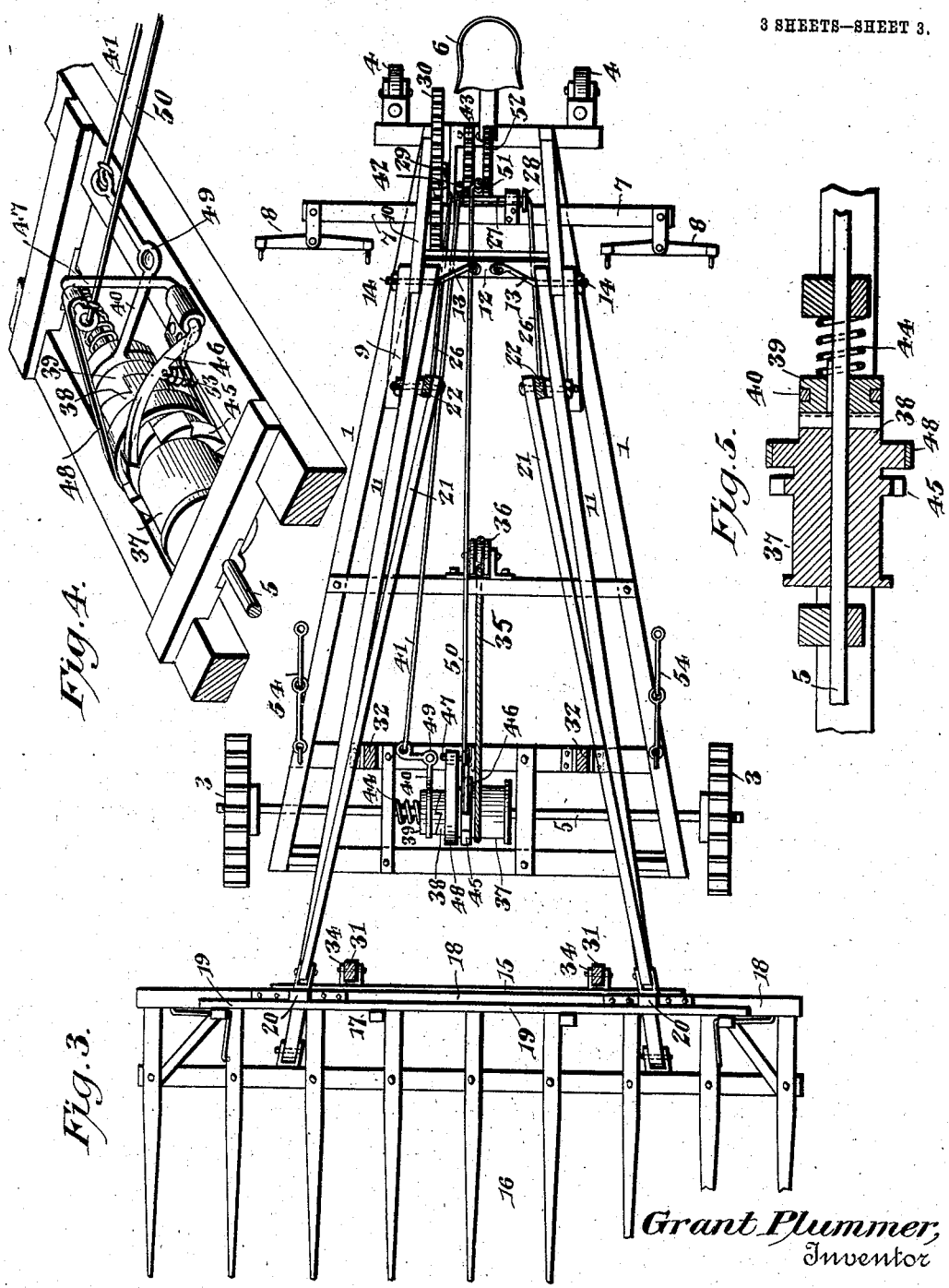

GRANT PLUMMER, OF SALINA, KANSAS.

HAY-LOADER.

No. 806,181. Specification of Letters Patent. Patented Dec. 5, 1905.

Application filed February 4, 1905. Serial No. 244,214.

*To all whom it may concern:*

Be it known that I, GRANT PLUMMER, a citizen of the United States, residing at Salina, in the county of Saline and State of Kansas, have invented a new and useful Hay-Loader, of which the following is a specification.

The invention relates to improvements in hay-loaders.

The object of the present invention is to improve the construction of hay-loaders, more especially that shown and described in Patent No. 761,710, granted to me the 7th day of June, 1904, and to provide simple, inexpensive, and efficient means within easy reach of the driver for controlling the fork, whereby the same is dropped to the ground and held in position for picking up hay or grain, and it is swung upwardly when loaded to retain the load in place until it is elevated and carried to the desired point and is finally permitted to swing downward under the weight of the load for discharging the same.

A further object of the invention is to provide means adapted to permit the fork to be arranged in a horizontal or upwardly-inclined position for retaining the load in place and capable of maintaining the fork in such position with relation to the ground during its entire upward movement.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a hay-loader constructed in accordance with this invention, the fork being in position for gathering a load of hay or grain. Fig. 2 is a longitudinal sectional view of the same, the elevating and discharging positions of the fork being illustrated in dotted lines. Fig. 3 is a plan view. Fig. 4 is an enlarged detail perspective view illustrating the construction of the drum, the sliding clutch, and the means for controlling the same. Fig. 5 is a sectional view taken longitudinally of the drum and the clutch. Fig. 6 is an enlarged detail perspective view of the rear portion of the machine, parts being broken away to illustrate more clearly the arrangement of the operating-levers and their connecting means. Fig. 7 is a detail view illustrating the construction of the swinging fulcrum of the fork-elevating lever.

Like numerals of reference designate corresponding parts in all the figures of the drawings.

1 designates a main or loader frame, which may be constructed in any desired manner, but which is preferably composed of rearwardly-converging side bars and suitable connecting-bars. The main or loader frame is supported by carrying-wheels 3 and caster-wheels 4, located, respectively, at the front and back of the frame, the carrying-wheels being mounted on and adapted to rotate a transverse drive-shaft 5. The rear end of the main or loader frame is provided with a seat 6 for the accommodation of the driver, and it has a transverse draft-bar 7, extending laterally from the rear portion of the frame and provided at its extended portion with swingletrees 8 for the attachment of the draft-animal; but any other suitable means may be provided for this purpose.

The main or loader frame is provided at opposite sides with upwardly-extending supports composed of oppositely-inclined bars or standards 9 and 10 and having pivoted to them the rear end of a vertically-swinging fork-frame 11. The rearwardly-inclined bars 10 of the supports are connected by a cross-bar 12, and the supports are stiffened by inclined brace-rods 13, located between the supports and extending upward from the cross-bar 12. The upper ends of the bracing-rods are bent horizontally and form pivots for connecting the vertically-movable fork-frame to the rear supports of the main or loader frame. The pivots 14 also pierce and connect the upper ends of the inclined bars or standards 9 and 10 and are threaded to receive nuts.

The vertically-swinging fork-carrying frame is composed of rearwardly-converging side bars and a front connecting transverse bar 15, located a short distance in rear of the front ends of the side bars. The extended front ends of the side bars of the vertically-swinging frame are pivotally connected to a tiltable fork 16, composed of spaced forwardly-extending tines or teeth and transverse connecting-bars. The tiltable fork is provided at the back with an upwardly-extending guard 17, consisting of arms or teeth extending upward from the rear transverse bar 18 of the fork and connected by a cross-bar 19. Two upwardly-extending arms or teeth 20 of the guard are located in rear of the cross-piece 19 and are pivoted to the front ends of a pair of rearwardly-extending connecting-bars 21, which have their rear ends adjustably pivoted to a pair of oppositely-disposed upright levers 22. The arms or teeth 20 of the guard are provided with perforated ears or flanges to receive the front ends of the connecting-bars 21, and the cross-bar 18 is cut away at opposite sides to provide recesses 23 to permit the fork to clear the sides of a vertically-swinging fork-carrying frame. This increases the pivotal movement of the fork, and the recesses are spanned by short pieces 24, upon which the arms or teeth 20 are mounted; but the fork and the fork-carrying frame may be constructed in any other desired manner to permit the desired swing of the former.

The oppositely-disposed upright levers 22 are fulcrumed between their ends on suitable pivots 25 and are provided at their upper arms with perforations to permit the adjustment of the connecting-bars 21. The lower arms of the levers 22 are also provided with perforations, and a pair of connecting-rods 26 are adjustably connected to the same. The rods extend rearwardly to a transverse rock-shaft 27, journaled in suitable bearings of the main or loader frame and preferably mounted on the draft-bar, to which the swingletrees are connected. The rock-shaft 27 is provided with upwardly-extending arms 28 and 29, one of which is elongated to provide an operating arm or lever. The elongated arm 29 is provided with a spring-actuated detent arranged to engage a curved ratchet 30 for securing the arm or lever in its adjustment. The operating-arm or lever 29 is located adjacent to the seat within easy reach of the driver. By adjusting the arm or lever 29 the fork may be swung upwardly or downwardly, and it is capable of being adjusted and held in proper position with relation to the ground for gathering the hay or grain, and after it has received a load it may be readily raised to a horizontal or upwardly-inclined position for retaining the load on it while it is being elevated by the means hereinafter described. After the tiltable fork is elevated the operating arm or lever 29 is operated to swing the fork downwardly for discharging the load.

The load is raised by a fork-elevating lever 31, consisting of a trussed frame fulcrumed between its ends on an oscillatory fulcrum 32, both of which parts are constructed substantially the same as those shown and described in the said patent; but they may be varied in construction to obtain the desired strength and lightness. The sides of the swinging fulcrum are hinged at their lower ends to the loader-frame and are pivotally connected at their upper ends to the fork-elevating lever by means of a transverse rod 33. The sides of the fork-elevating lever are arranged at an angle, being converged rearwardly, and the front ends of the sides are hinged to the cross-bar 15 of the vertically-swinging fork-carrying frame. The cross-bar 15 is provided with projecting ears or flanges 34, which receive the sides of the fork-elevating lever. The rear arm of the fork-elevating lever is swung downwardly or rearwardly, and the fork-carrying frame is raised, carrying with it the tiltable fork. This movement also swings the fulcrum 32 rearward and enables the tiltable fork to be moved upward by the lever 31. The connecting-bars 21 are arranged in substantially parallelism with the sides of the fork-carrying frame, and the upright levers are disposed in substantially parallelism with the guard of the tiltable fork, whereby when the latter moves upward it will be maintained in the same position with relation to the ground throughout its entire movement.

The rear end of the fork-elevating lever is connected to one end of a cable 35, which extends downward to a guide-pulley 36 and forwardly therefrom to a drum 37. The guide-pulley is mounted on the loader-frame, and the drum, which is loosely arranged on the transverse drive-shaft, is provided at one end with a clutch-face 38, arranged to be engaged by a sliding clutch collar or sleeve 39, which is slidably connected with the shaft by means of a suitable key and keyway. The sliding clutch-collar is provided with an annular groove into which extends one arm of an L-shaped shifting lever 40, fulcrumed at its angle on the loader-frame and having its other arm connected by a rod or wire 41 with an operating-lever 42, located at the back of the loader-frame. The operating-lever 42 is arranged adjacent to the seat and is provided with a spring-actuated detent arranged to engage a curved ratchet 43 for holding the sliding clutch collar or section out of engagement with the drum. When the lever 42 is released, the sliding clutch section or collar is automatically engaged with the clutch-face of the drum by means of a coiled spring 44, mounted on a transverse shaft and engaging the outer end of the clutch section or collar. The drum, which is adapted to have the cable wound on it for elevating the tiltable fork, is provided with ratchet-teeth 45, which are engaged by a check-pawl 46, adapted to prevent retrograde rotation of the drum. The clutch formed by the clutch-face of the drum and the sliding clutch-section will permit the transverse shaft or axle to rotate backward freely; but the drum will be held against such backward movement by the check-pawl. By this construction the backing of the machine does not affect the mechanism for raising and lowering the tiltable fork. The check-pawl consists of one arm of a substantially L-shaped lever which has its other arm 47 connected with one end of a brake-band 48. The brake-band, which has one end secured to the loader-frame, is arranged to engage a portion of the drum, and when the lever is oscillated to lift the check-pawl out of engagement with the drum the brake-band will be carried into engagement with the same and will be adapted to control the downward movement of the tiltable fork. The lever, which engages the ratchet of the drum, is provided with a central bearing portion 49, which offsets its arms from each other and which forms a rock-shaft. The brake-band-receiving arm is connected by a rod or wire 50 with an operating-lever 51, located adjacent to the seat 6 and arranged within easy reach of the driver. The operating-lever 51 is provided with a spring-actuated detent arranged to engage a curved ratchet 52 for locking the lever 51 in its adjusted position. A spring 53 is connected with the check-pawl or drum-engaging arm of the lever for returning the same automatically to its engaging position when it is free to move.

The horses are hitched to the sides of the loader-frame, which is provided with suitable holdbacks 54, and as the machine moves forward over the ground the fork will rake up the hay or grain, which will accumulate on the tiltable fork. The tiltable fork is adapted to be adjusted to a downwardly-inclined position to suit the character of the ground and to properly rake the hay or grain. After a sufficient quantity has accumulated on the tiltable fork the clutch-operating lever is manipulated to cause the drive-shaft to rotate the drum. As the drum rotates the cable will be wound thereon, drawing down the rear end of the fork-elevating lever. The swinging of the fork-elevating lever raises the fork, as hereinbefore described. After the tiltable fork has been elevated the desired distance the clutch is thrown out of engagement with the drum, which will be held against backward movement by the check-pawl or arm of the drum-engaging lever. The machine is then run to the stack or to the place of discharge, and the tiltable fork is dumped by manipulating the operating arm or lever 29. As soon as the load is discharged and the machine is moved from the stack the tiltable fork may be gradually lowered to the ground by means of the brake, which is connected with the drum-engaging lever.

It will be seen that the tiltable fork is adjustable in any of its several positions and that it may be inclined downwardly at the desired angle for raking hay or grain and that it may be raised to a horizontal or upwardly-inclined position to retain the desired accumulation on it when it is elevated. Also it will be clear that the lever for operating the check-pawl also controls the brake-band and that the movement for disengaging the check-pawl from the drum carries the brake-band into movement with the same. The spring, which returns the check-pawl to its engaging position, operates to throw the brake-band off the drum.

Having thus fully described my invention, what I claim as new, and desire to secure by Letters Patent, is—

1. In a machine of the class described, the combination of a loader-frame, a vertically-movable fork-carrying frame, a tiltable fork mounted on the fork-carrying frame, and operating mechanism for positively tilting the fork in either direction and for also positively holding the same against movement on its pivot in either direction when not actuated by such operating mechanism, said operating mechanism embodying an adjusting device mounted on the loader-frame, and connecting means mounted on the fork-carrying frame and connected with the said adjusting device.

2. In a machine of the class described, the combination of a loader-frame, a vertically-swinging fork-frame, a tiltable fork mounted on the fork-frame, a lever fulcrumed on the fork-frame and connected with the tiltable fork, and an adjusting device mounted on the loader-frame and connected with the said lever.

3. In a machine of the class described, the combination of a loader-frame, a vertically-swinging fork-frame, a tiltable fork mounted on the fork-frame, a lever fulcrumed between its ends on the fork-frame, means for connecting one of the arms of the lever with the fork, and an adjusting device mounted on the loader-frame and connected with the other arm of the lever.

4. In a machine of the class described, the combination of a loader-frame, a vertically-swinging fork-frame, a tiltable fork mounted on the fork-frame, upright levers fulcrumed between their ends on the fork-frame at opposite sides thereof, bars connecting the upper arms of the levers with the tiltable fork, and a rock-shaft having arms connected with the lower arms of the levers.

5. In a machine of the class described, the combination of a loader-frame, a vertically-swinging fork-carrying frame, a tiltable fork mounted on the fork-carrying frame, a fork-elevating lever connected with the fork-carrying frame, a swinging fulcrum for the lever, and operating mechanism for positively tilting the fork in either direction and for also positively holding the same against movement on its pivot in either direction when not actuated by such operating mechanism, said operating mechanism comprising an adjusting device mounted on the loader-frame, and connecting means mounted on and movable with the fork-carrying frame and connecting the fork with the adjusting device.

In testimony that I claim the foregoing as my own I have hereto affixed my signature in the presence of two witnesses.

GRANT PLUMMER.

Witnesses:
G. M. BROOKS,
PETER SADULEY.